US006116284A

United States Patent [19]
Murray et al.

[11] Patent Number: 6,116,284
[45] Date of Patent: Sep. 12, 2000

[54] GUIDE STRUCTURE FOR PNEUMATIC APPLICATOR

[75] Inventors: Timothy A. Murray; Bradley J. Meyer; Dustin T. Burchill, all of Fargo, N. Dak.

[73] Assignee: Case Corporation, Racine, Wis.

[21] Appl. No.: 09/369,989

[22] Filed: Aug. 6, 1999

[51] Int. Cl.[7] ............................ F15D 55/00; B65G 47/24

[52] U.S. Cl. ............................ 138/39; 138/37; 138/109; 406/87; 111/34

[58] Field of Search ...................... 138/37, 39, 112–114, 138/115–117; 406/87; 111/34

[56] References Cited

U.S. PATENT DOCUMENTS 1,096,623 5/1914 Girtanner .............................. 138/39 X
3,206,836 9/1965 Schlussler .............................. 138/114 X
3,597,166 8/1971 Hochman .............................. 138/39 X
3,627,056 12/1971 Rogers .............................. 172/40
3,756,244 9/1973 Kinnear et al. .............................. 138/114 X
4,024,822 5/1977 Ross et al. .............................. 111/34
4,087,892 5/1978 Golobay .............................. 61/72.6
4,575,287 3/1986 Kelm .............................. 406/87
4,577,995 3/1986 Sadahiro .............................. 404/117
4,586,947 5/1986 Stanton .............................. 404/117

*Primary Examiner*—Patrick Brinson
*Attorney, Agent, or Firm*—Jansson, Shupe, Bridge & Munger, Ltd.

[57] ABSTRACT

A guide structure is provided for guiding the flow of particulate matter from a source to a distribution manifold. The guide structure includes a generally tubular elbow defining a flow path for the particulate matter. First and second veins are positioned within the elbow so as to lie in the flow path in the particulate matter. A flow tube is positioned between the output of the elbow and the distribution manifold. A forcing cone is positioned within the flow tube adjacent the output thereof to reduce the inner diameter of the flow tube and to increase the velocity of the flow of particulate matter therethrough.

17 Claims, 2 Drawing Sheets

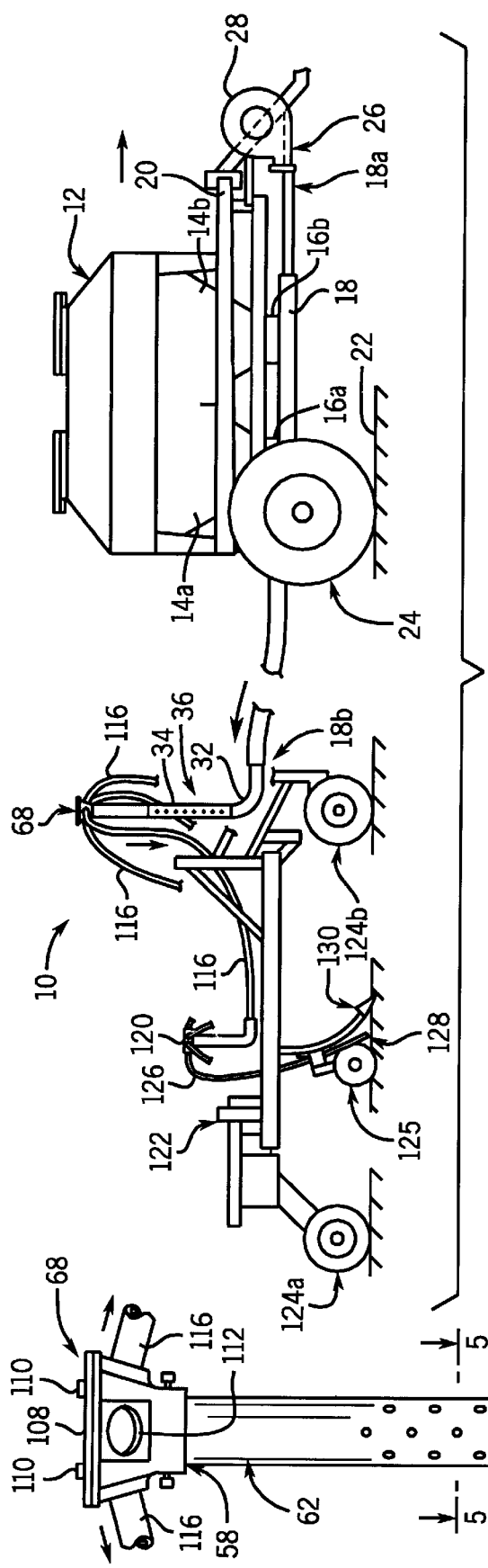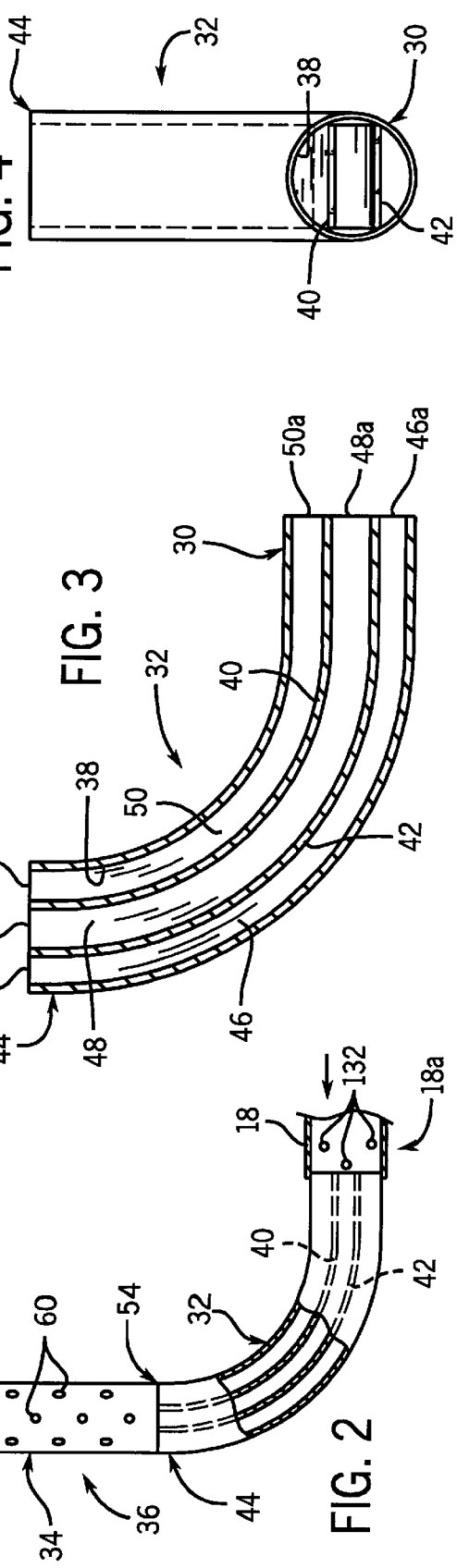
FIG. 1
FIG. 2
FIG. 3
FIG. 4

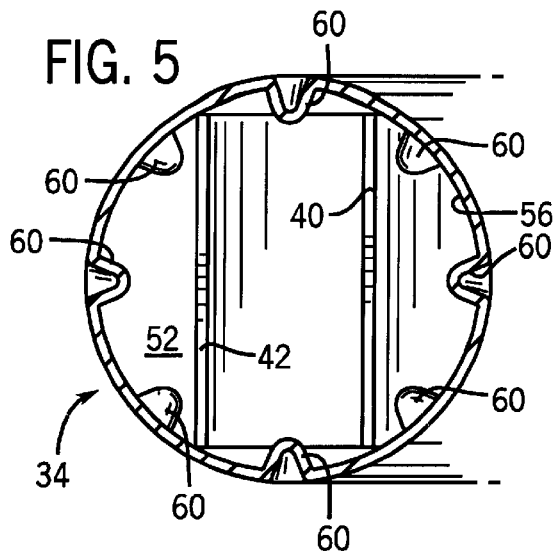
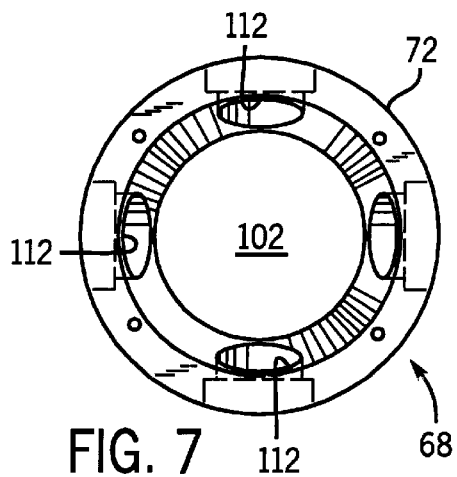
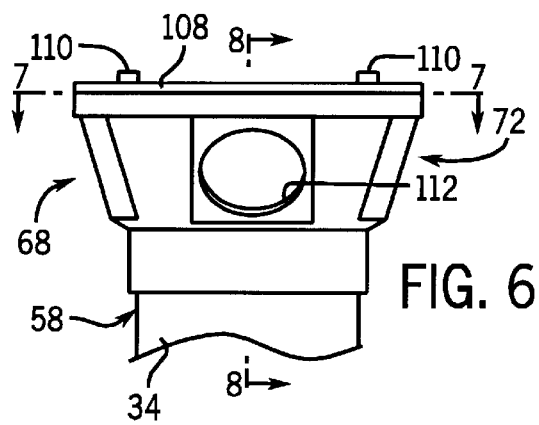
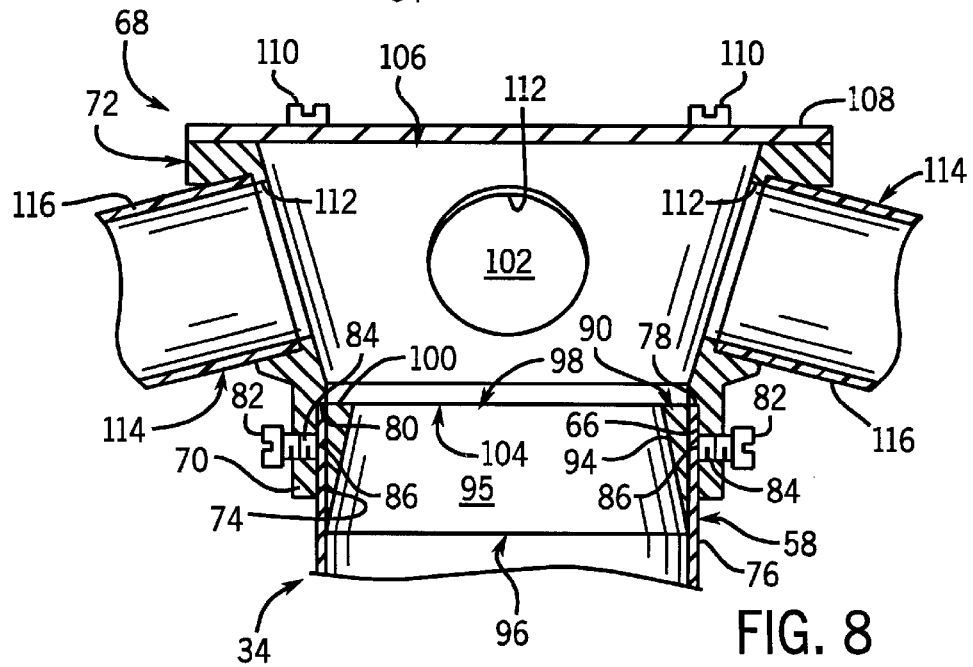

GUIDE STRUCTURE FOR PNEUMATIC APPLICATOR

FIELD OF THE INVENTION

This invention relates to seeding and fertilizing equipment, and in particular, to a guide structure for facilitating the uniform distribution of seeds and fertilizer with a pneumatic applicator.

BACKGROUND OF THE INVENTION

Pneumatic applicators are often used in the seeding and fertilizing of agricultural fields. A pressurized hopper is filled with the seed or other particulate matter to be distributed. The hopper includes a metering device at its lower end for controlling the feeding of the particulate matter into a main conduit. The main conduit extends from the output of a centrifugal fan to a primary distribution manifold. Branch lines run from the primary distribution manifold to secondary distribution manifolds which, in turn, distribute the particulate matter over a predetermined area. The centrifugal fan creates an air stream to carry the particulate matter which enters the main conduit from the hopper through the metering device to the primary and secondary distribution manifolds in order to be distributed.

It has been found that in order to uniformly distribute particulate matter with a pneumatic applicator, it is necessary to achieve a uniform distribution of the particulate matter across the cross-section of the portion of the main conduit extending between the centrifugal fan and the primary distribution manifold. Typically, in prior pneumatic applications, the main conduit includes a horizontal section extending from the centrifugal fan and a vertical portion extending into the primary distribution manifold. The horizontal and vertical portions of the main conduit are interconnected by an elbow. During use, the particulate matter will tend to become concentrated within the rear of the elbow such that the distribution of particulate matter within the vertical portion of the main conduit is no longer uniform. This, in turn, results in the non-uniform distribution of the particulate matter by the pneumatic applicator.

Numerous approaches have been developed to improve the distribution of the particulate matter across this cross-section of the main conduit. By way of example, Kelm, U.S. Pat. No. 4,575,284 discloses a pneumatic applicator wherein a section of the main conduit includes inwardly directed, internal projections which urge the particulate matter toward the center of the main conduit. A conical forcing cone may be positioned on the output end of this section of the main conduit to gradually narrow the flow path and increase the velocity of the air stream into the distribution manifold.

However, as shown in the Kelm '284, prior forcing cones are of a uniform thickness. Due to such a construction, forcing cones tend to become damaged when interconnected to corresponding distribution manifolds. If a forcing cone is damaged such that the forcing cone is no longer symmetrical with respect to the longitudinal axis of the vertical portion of the main conduit, the flow of particulate matter into the distribution manifold will no longer be uniform. This, in turn, results in a non-uniform distribution of particulate matter by the pneumatic applicator. Consequently, while the pneumatic applicator disclosed in the Kelm '284 patent somewhat improves the uniformity of the distribution of the particulate matter, it is highly desirable to further improve the uniformity of the distribution of the particulate matter beyond that provided by the pneumatic applicator disclosed in the Kelm '284 patent.

Therefore, it is a primary object and feature of the present invention to provide a guide structure for facilitating the uniform distribution of seed and fertilizer with a pneumatic applicator.

It is a further object and feature of the present invention to provide a guide structure for a pneumatic applicator which is simple and inexpensive to manufacture.

It is a still further object and feature of the present invention to provide guide structure for a pneumatic applicator which is more durable than prior art guide structures.

SUMMARY OF THE PRESENT INVENTION

In accordance with the present invention, a guide structure is provided for guiding the flow of particulate matter from a source to a distribution manifold. The guide structure includes a generally tubular elbow having an inner surface defining a flow path for the particulate matter. The elbow has an input and an output. First and second vanes are positioned within the elbow. The vanes extend between the input and output of the elbow so as to lie in the flow path of the particulate matter.

It is contemplated to provide a generally cylindrical flow tube having an inner surface defining a second flow path for the particulate matter. The flow tube has an input interconnected to the output of the elbow such that the first and second flow paths are in communication. The flow tube may also include an output positioned within the distribution manifold. A forcing cone is positioned within the flow tube adjacent the output thereof so as to reduce the diameter of the portion of the second flow path at the output of the flow tube. A connection structure extends through the distribution manifold and engages the flow tube to retain the distribution manifold thereon. The inner surface of the flow tube may include a plurality of projections extending therefrom into the second flow path. The plurality of projections are grouped into a plurality of annular rows. The projections in the first row are offset with respect to the projections in an adjacent row.

In accordance with a still further aspect of the present invention, a guide structure is provided for guiding the flow of particulate matter from a source to a distribution manifold. The guide structure includes the generally cylindrical flow tube having an inner surface defining a flow path for the particulate matter. The flow tube has an input end and an opposite, output end receivable within the distribution manifold. A forcing cone is positioned within the flow tube adjacent the output end thereof. The forcing cone reduces the diameter of a portion of a flow path at the output end of the flow tube. A connection assembly extends through the distribution manifold and engages the flow tube to retain the distribution manifold on the output end of the flow tube.

It is contemplated that a portion of the inner surface of the flow tube include a plurality of projections extending into the flow path. The plurality of projections are grouped into a plurality of annular rows. The projections in a first row are offset with respect to the projections in an adjacent row. The inner surface adjacent the output end of the flow tube is free of projections.

It is further contemplated to provide a scattering tube having an input for receiving particulate matter from the source and an output in communication with the input of the flow tube. The scattering tube includes a plurality of passageways extending from the input to the output thereof. Each passageway in the scattering tube provides a corresponding path for the flow of particulate matter therethrough. The input and the output of the scattering tube lie in corresponding planes which are perpendicular to each other.

In accordance with a still further aspect of the present invention, a guide structure is provided for guiding the flow of granular matter from a source to a distribution manifold. The guide structure includes a scattering tube having an input and an output. The scattering tube includes a plurality of passageways therein to accommodate the flow of particulate matter through the scattering tube from the input to the output. A generally cylindrical flow tube is also provided. The cylindrical flow tube has an input in communication with the output of the scattering tube and an output positioned within the distribution manifold. The flow tube includes an inner surface defining a path for the flow of particulate matter. A forcing cone is positioned within the flow tube adjacent the output thereof so as to reduce the diameter of a portion of the path.

It is contemplated that a connection assembly extend through the distribution manifold and engage the flow tube to retain the distribution manifold on the flow tube. A portion of the inner surface of the flow tube includes a plurality of projections extending into the path. The plurality of projections are grouped into a plurality of annular rows. The projections in a first row are offset with respect to the projections in an adjacent row. The inner surface of the flow tube adjacent the output of the flow tube is free of projections.

It is contemplated that the scattering tube of the guide structure have an elbow configuration and include a plurality of veins therein. Each vein within the elbow of the scattering tube partially defines a passageway in the scattering tube.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is a side elevational view of a pneumatic applicator incorporating the guide structure of the present invention;

FIG. 2 is a side elevational view, with portions broken away, showing the guide structure of the present invention;

FIG. 3 is a cross-sectional view of an elbow for the guide structure of the present invention;

FIG. 4 is a front elevational view of the elbow of FIG. 3;

FIG. 5 is a cross sectional view taken along line 5—5 of FIG. 2;

FIG. 6 is an enlarged, side elevational view showing a distribution manifold for mounting on the output of the guide structure of the present invention;

FIG. 7 is a cross-sectional view taken along line 7—7 of FIG. 6; and FIG. 8 is a cross-sectional view taken along line 8—8 of FIG. 6.

DETAILED DESCRIPTION OF THE DRAWINGS

Referring to FIG. 1, a pneumatic applicator incorporating the guide structure of the present invention is generally designated by the reference numeral 10. Pneumatic applicator 10 includes a hopper 12 having one or more pressurized tanks 14*a* and 14*b* for receiving particulate matter such as seeds and/or fertilizer therein. Each tank 14*a* and 14*b* includes a lower end having a corresponding metering device 16*a* and 16*b* for controlling the feeding of the particulate matter in tanks 14*a* and 14*b*, respectively, into main conduit 18. Hopper 12 is mounted on a frame structure 20 extending along a longitudinal axis. As is conventional, frame structure 20 is attached to the rear of a towing vehicle and is supported above a supporting surface 22 by a wheel and axle assembly 24.

Main conduit 18 includes a first end 18*a* interconnected to and in communication with the output end 26 of centrifugal fan 28. Centrifugal fan 28 provides an air stream of a predetermined velocity into main conduit 18. The output end 18*b* of main conduit 18 is interconnected to and in communication with input end 30 of elbow 32. As hereinafter described, elbow 32 and flow tube 34 define the guide structure of the present invention, generally designated by the reference numeral 36.

Elbow 32 includes an inner surface 38 defining the interior thereof. First and second veins 40 and 42, respectively, extend between input end 30 of elbow 32 and output end 44 of elbow 32. Veins 40 and 42 divide the interior of elbow 38 into first, second and third passageways 46, 48, and 50, respectively, in elbow 32. Inputs 46*a*, 48*a* and 50*a* of passageways 46, 48 and 50, respectively, communicate with the interior of main conduit 18. Outputs 46*b*, 48*b* and 50*b* of passageways 46, 48 and 50, respectively, of elbow 32 communicate with interior 52 of flow tube 34 through input end 54 thereof.

Interior 52 of flow tube 34 is defined by a generally cylindrical inner surface 56 which extends between input end 54 and output end 58 of flow tube 34. Flow tube 34 extends along a vertical axis and includes a lower portion having a plurality of inwardly directed projections 60 extending into the interior 52 thereof from inner surface 56. Inwardly directed projections 60 are grouped in annular rows such that each row of projections 60 is offset with respect to an adjacent row. As best seen in FIG. 2, an upper portion, generally designated by the reference numeral 62, of inner surface 56 of flow tube 34 is free of projections.

Referring to FIGS. 7 and 8, output end 58 of flow tube 34 is received with a flow tube receiving cavity 66 in primary distribution manifold 68. Flow tube receiving cavity 66 is defined by a generally cylindrical wall 70 depending from a primary dividing header 72. Wall 70 of primary distribution manifold 68 includes a generally cylindrical inner surface 74 which engages outer cylindrical surface 76 of flow tube 34. It is contemplated that the diameter of flow tube receiving cavity 66 approximate the outer diameter of flow tube 34 such that output end 58 of flow tube 34 is snugly received within flow tube receipt cavity 66 in primary distribution manifold 68.

With output end 58 of flow tube 34 fully inserted into flow tube receipt cavity 66, terminal edge 78 of output end 58 of flow tube 34 abuts shoulder 80 formed at the intersection of wall 70 and primary dividing header 72. Bolts 82 are threaded into corresponding threaded apertures 84 in wall 70 such that terminal faces 86 of bolts 82 engage outer cylindrical surface 76 of flow tube 34 and retain primary distribution manifold 68 on output end 58 thereof.

A generally cylindrical forcing cone 90 having an outer diameter generally equal to the diameter of interior 56 of flow tube 34 is positioned within output end 58 of flow tube 34 such that the outer surface 92 of forcing cone 90 engages inner surface 56 of flow tube 34. It is contemplated that forcing cone 90 add strength and rigidity to output end 58 of flow tube 34 so as to prevent damage to output end 58 when interconnected to primary distribution manifold 68 as heretofore described. Forcing cone 90 includes a generally conical inner surface 94 extending between first and second ends 96 and 98, respectively, thereof. Inner surface 94 tapers inwardly between first and second ends 96 and 98, respectively, of forcing cone 90 such that passageway 95 through cone 90 has a diameter at first end 96 thereof approximating the inner diameter of flow tube 34 and a reduced diameter at second end 98. As best seen in FIG. 8, it is contemplated that terminal edge 100 at end 98 of forcing cone 90 be generally co-planar with terminal edge 78 of output end 58 of flow tube 34.

Primary dividing header 72 of primary distribution manifold 68 defines a generally conical cavity 102 therein having a first end 104 communicating with passageway 95 through forcing cone 90. Upper end 106 of cavity 102 in primary dividing header 72 is closed by a generally flat plate 108 which is interconnected to primary dividing header 72 by a plurality of bolts 110. Primary dividing header 72 further includes a plurality of circumferentially spaced outputs 112 which are in communication with interior 102 of primary dividing header 72. Output 112 are adapted to receive ends 114 of a corresponding flexible distribution tubes 116. As is conventional, flexible distribution tubes 116 extend from primary distribution manifold 68 to corresponding secondary distribution manifolds 120 (one shown). Referring back to FIG. 1, secondary distribution manifolds 120 are mounted on a corresponding frame 122 which extends along a central frame axis and is supported above supporting surface 22 by a plurality of wheel and axle assemblies 124a and 124b. A leveling disc 125 is provided to cover the particulate matter deposited in a furrow, as hereinafter described. Flexible hoses 126 extend from each opening in each secondary distribution manifold 120 to a corresponding seed boot 128 secured to and associated with a corresponding ground opener 130.

In operation, metering devices 16a and 16b provide the controlled feeding of particulate matter, such as seeds and/or fertilizer, from corresponding tanks 14a and 14b, respectively, of hopper 12 into the air stream in main conduit 18 generated by centrifugal fan 28. The particulate matter is carried by the air stream into elbow 32. Veins 42 and 44 in elbow 32 divide the particulate matter into inputs 46a, 48a and 50a of passageways 46, 48 and 50, respectively, in elbow 32 so as to disperse the concentration of particulate matter entering flow tube 34.

The air stream generated by centrifugal fan 28 continues to carry the particulate matter through outputs 46b, 48b and 50b of passageway 46, 48 and 50, respectively, of elbow 32 into input end 54 of flow tube 34. As the particulate matter enters flow tube 34, such particular matter engages inwardly directed projections 60 along the inner surface 56 of flow tube 34 so as to further improve the uniformity of the distribution of particulate matter across the cross section of flow tube 34. After flowing past projections 60, the particulate matter in the air stream may be concentrated in certain areas of the interior 52 of flow tube 34 depending upon the configuration of projections 60. Portion 62 of flow tube 34 which is free of projections 60 further improves the distribution of particulate matter within the interior 52 of flow tube 34 without creating localized concentrations of particulate matter in the air stream.

As the particulate matter is carried by the air stream into passageway 95 of forcing cone 90, the velocity of the air stream increases due to the reduction in the diameter of passageway 95 of forcing cone 90 between the first and second ends 96 and 98, respectively, thereof. By increasing the velocity of the air stream, forcing cone 90 further improves the uniformity of the distribution of the particulate matter as the particulate matter enters cavity 102 within the primary distribution manifold 68.

Thereafter, the particular matter is carried by the air stream and distributed through openings 112 in primary dividing header 72 of primary distribution manifold 68 to the plurality of secondary distribution manifolds 120 (one shown) by flexible tubes 116 wherein particulate matter is carried by the air stream and dispensed by corresponding seat boots 128 through flexible tubing 126 into a furrow formed by ground opener 130, as is conventional.

As described, pneumatic applicator 10 provides for the uniform distribution of seeds and/or fertilizer through seed boots 128. Referring to FIG. 2, it is contemplated to further increase the uniformity of the distribution of the particulate matter by providing inwardly directed projections 132 within main conduit 18. Such inwardly directed projections 132 in main conduit 18 prior to elbow 32 act as a turbulent region to uniformly distribute the particulate matter across the cross section of main conduit 18 prior to the particulate matter entering elbow 32.

Various modes of carrying out the invention are contemplated as being within the scope of the following claims particularly pointing out and distinctly claiming the subject matter which is regarded as the invention.

We claim:

1. A guide structure for guiding the flow of particulate matter from a source to a distribution manifold, comprising:
    a generally tubular elbow having an inner surface defining a flow path for the particulate matter, the elbow having an input and an output;
    first and second vanes positioned within the elbow, the vanes extending between the input and the output of the elbow so as to lie in the flow path of the particulate matter;
    a generally cylindrical flow tube having an outer surface and an inner surface defining a second flow path for the particulate matter, the flow tube having an input interconnected to the output of the elbow such that the first and second flow paths are in communication, and an output positioned within the distribution manifold;
    a forcing cone positioned within the flow tube adjacent the output thereof, the forcing cone including an outer surface engaging the inner surface of the flow tube and an inner surface forming a generally conical shaped passageway through the forcing cone so as to reduce the diameter of a portion of the second flow path at the output of the flow tube.

2. The guide structure of claim 1 further comprising a connection structure extending through the distribution manifold and engaging the outer surface of the flow tube to retain the distribution manifold on the flow tube wherein the forcing cone prevents deformation of the flow tube during connection of the distribution manifold thereto with the connection structure.

3. The guide structure of claim 1 wherein the inner surface of the flow tube includes a plurality of projections extending into the second flow path.

4. The guide structure of claim 3 wherein the plurality of projections are grouped into a plurality of annular rows, the projections in a first row being offset with respect to the projections in an adjacent row.

5. A guide structure for guiding the flow of particulate matter from a source to a distribution manifold, comprising:
    a generally cylindrical flow tube including an inner surface defining a flow path for the particulate matter, the flow tube having an input end and an opposite, output end receivable within the distribution manifold;
    a forcing cone positioned within the flow tube adjacent the output end thereof, the forcing cone including an outer surface engaging the inner surface of the flow tube and an inner surface defining a generally conical shaped passageway through the forcing cone so as to reduce the diameter of a portion of the flow path at the output end of the flow tube; and a connection assembly extending through the distribution manifold and engaging the outer surface of the flow tube to retain the distribution manifold on the output end of the flow tube assembly wherein the forcing cone prevents deformation of the flow tube during connection of the distribution manifold thereto with the connection structure.

6. The guide structure of claim 5 wherein a portion of the inner surface of the flow tube includes a plurality of projections extending into the flow path.

7. The guide structure of claim 6 wherein the plurality of projections are grouped into a plurality of annular rows, the projections in a first row being offset with respect to the projections in an adjacent row.

8. The guide structure of claim 6 wherein the inner surface adjacent the output end of the flow tube is free of projections.

9. The guide structure of claim 5 further comprising a scattering tube having an input for receiving particulate matter from the source and an output in communication with the input of the flow tube.

10. The guide structure of claim 9 wherein the scattering tube includes a plurality of passageways extending from the input to the output thereof, each passageway providing a corresponding path for the flow of particulate matter therethrough.

11. The guide structure of claim 10 wherein the input and the output of the scattering tube lie in corresponding planes, the planes being perpendicular to each other.

12. A guide structure for guiding the flow of particulate matter from a source to a distribution manifold, comprising:

a scattering tube having an input and an output, the scattering tube including a plurality of passageways therein to accommodate the flow of particulate matter through the scattering tube from the input to the output;

a conduit extending between the source and the input of the scattering tube and having an inner surface defining a particulate path therebetween the inner surface including a plurality of projections extending into the particulate path;

a generally cylindrical flow tube having an input in communication with the output of the scattering tube and an output positioned with in the distribution manifold, the flow tube including an inner surface defining a path for the flow of the particulate matter therethrough; and a forcing structure positioned within the flow tube adjacent the output thereof so as to reduce the diameter of a portion of the path.

13. The guide structure of claim 12 further comprising a connection assembly extending through the distribution manifold and engaging the flow tube to retain the distribution manifold on the flow tube.

14. The guide structure of claim 12 wherein a portion of the inner surface of the flow tube includes a plurality of projections extending into the path.

15. The guide structure of claim 14 wherein the plurality of projections are grouped into a plurality of annular rows, the projections in a first row being offset with respect to the projections in an adjacent row.

16. The guide structure of claim 15 wherein the inner surface adjacent the output of the flow tube is free of projections.

17. The guide structure of claim 12 wherein the scattering tube has an elbow configuration and includes a plurality of vanes therein, each vane partially defining a passageway in the scattering tube.

* * * * *